United States Patent
Lee

(10) Patent No.: US 9,269,942 B2
(45) Date of Patent: Feb. 23, 2016

(54) SECONDARY BATTERY

(71) Applicant: Samsung SDI Co., Ltd., Yongin, Gyeonggi-do (KR)

(72) Inventor: Wonil Lee, Yongin (KR)

(73) Assignee: SAMSUNG SDI CO., LTD., Yongin, Gyeonggi-do (KR)

( * ) Notice: Subject to any disclaimer, the term of this patent is extended or adjusted under 35 U.S.C. 154(b) by 25 days.

(21) Appl. No.: 13/786,286

(22) Filed: Mar. 5, 2013

(65) Prior Publication Data

US 2014/0037994 A1    Feb. 6, 2014

(30) Foreign Application Priority Data

Aug. 3, 2012  (KR) .................. 10-2012-0085399

(51) Int. Cl.
| | |
|---|---|
| *H01M 4/64* | (2006.01) |
| *H01M 4/00* | (2006.01) |
| *H01M 2/34* | (2006.01) |
| *C25D 7/00* | (2006.01) |
| *H01M 2/26* | (2006.01) |
| *C25D 5/10* | (2006.01) |
| *C25D 5/12* | (2006.01) |
| *C23C 18/16* | (2006.01) |

(52) U.S. Cl.
CPC ............. *H01M 2/34* (2013.01); *C23C 18/1651* (2013.01); *C23C 18/1653* (2013.01); *C25D 5/10* (2013.01); *C25D 5/12* (2013.01); *C25D 7/00* (2013.01); *H01M 2/26* (2013.01); *H01M 2/266* (2013.01); *H01M 2200/00* (2013.01)

(58) Field of Classification Search
CPC ........................................ H01M 8/02
See application file for complete search history.

(56) References Cited

U.S. PATENT DOCUMENTS

| | | | | |
|---|---|---|---|---|
| 2004/0012480 | A1* | 1/2004 | Nakamura et al. | 338/328 |
| 2005/0122667 | A1* | 6/2005 | Moon | 361/600 |
| 2009/0084589 | A1* | 4/2009 | Tan | 174/257 |
| 2010/0129687 | A1 | 5/2010 | Kim | |
| 2010/0248007 | A1* | 9/2010 | Kwon et al. | 429/159 |
| 2011/0129701 | A1* | 6/2011 | Seo | 429/7 |

FOREIGN PATENT DOCUMENTS

| | | |
|---|---|---|
| KR | 20080109769 A | 12/2008 |
| KR | 20100008591 A | 1/2010 |
| KR | 20100058100 A | 6/2010 |
| KR | 20100081484 A | 7/2010 |

\* cited by examiner

*Primary Examiner* — Jacob Marks

(74) *Attorney, Agent, or Firm* — Knobbe Martens Olson & Bear LLP

(57) ABSTRACT

A secondary battery including a circuit board unnecessitating a cut-out portion is provided. The secondary battery includes a battery cell having a cell tab, a protective circuit module electrically connected to the cell tab and having a circuit pattern formed therein, and a connection tab attached to the protective circuit module and electrically connected to the circuit pattern, wherein the connection tab includes a conductive layer adhered to the protective circuit module and including a first plating layer formed on the conductive layer and a second plating layer formed on the first plating layer, and the cell tab is welded to the connection tab.

13 Claims, 4 Drawing Sheets

SECONDARY BATTERY

CROSS-REFERENCE TO RELATED APPLICATION

This application claims priority to and the benefit of Korean Patent Application No. 10-2012-0085399 filed on Aug. 3, 2012, in the Korean Intellectual Property Office, the disclosure of which is incorporated in its entirety herein by reference.

BACKGROUND

1. Field

The present embodiments relate to a secondary battery.

2. Description of the Related Art

Portable electric/electronic devices have a battery pack to be operated in any place where a power source is not separately available. The battery pack employs rechargeable secondary batteries in an economical aspect.

Examples of the secondary battery include nickel-cadmium (Ni—Cd), nickel-metal hydride (Ni-MH), lithium (Li) batteries, and lithium ion batteries. Among them, the Li secondary batteries are widely used for portable electric-electronic devices because of a five times higher operating voltage and a higher energy density per unit weight than the Ni—Cd or Ni-MH batteries.

Secondary batteries are manufactured in various shapes such as a cylindrical shape, a prismatic shape and a pouch shape.

In addition, secondary batteries are used with a protective circuit module connected to a battery cell in view of safety. The protective circuit module is used in the secondary battery such that a printed circuit pattern is formed on an insulating substrate, and a plurality of electric devices and a protection circuit, are attached to the printed circuit pattern.

However, a portion of the protective circuit module should be cut out to enable welding of a cell tab of the battery cell.

SUMMARY

An aspect of the present embodiments provides a secondary battery including a circuit board in which a cut-out portion is not necessary.

Another aspect of the present embodiments provides a secondary battery including a battery cell having a cell tab, a protective circuit module electrically connected to the cell tab and having a circuit pattern formed therein, and a connection tab attached to the protective circuit module and electrically connected to the circuit pattern, wherein the connection tab includes a conductive layer adhered to the protective circuit module and including a first plating layer formed on the conductive layer and a second plating layer formed on the first plating layer, and the cell tab is welded to the connection tab.

The conductive layer may be made of nickel (Ni). In addition, the conductive layer may be adhered to the protective circuit module using an adhesive. The circuit pattern may be soldered to the connection tab. The first plating layer may be made of at least one metal selected from the group consisting of gold (Au), silver (Ag) and copper (Cu), and the second plating layer may be made of nickel (Ni). The conductive layer may have a thickness in a range of about 0.1 to about 0.2 mm, and the first plating layer and the second plating layer may have a thickness in a range of about 0.01 to about 0.1 mm. The thickness of the conductive layer is about 1.5 to about 5 times that of the circuit pattern. The cell tab may include a negative electrode tab and a positive electrode tab, and the connection tab may include a first connection tab connected to the negative electrode tab and a second connection tab connected to the positive electrode tab. The conductive layer of the second connection tab may include a first region disposed in the protective circuit module, a second region upwardly bent from the first region, and a third region bent from the second region to be parallel with the first region. The first and second plating layers of the second connection tab may be formed on the first region, the second region and the third region. The first and second plating layers of the second connection tab may be formed on the first region. The conductive layer may be made of nickel (Ni).

As described above, in the secondary battery according to the present embodiments, since a cut-out portion of the protective circuit module is unnecessitated, a mounting space of a circuit pattern and components can be maximized.

In addition, since the processing cost of the protective circuit module can be reduced and the welding method is simplified, the production efficiency of the secondary battery can be improved.

BRIEF DESCRIPTION OF THE DRAWINGS

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings.

DETAILED DESCRIPTION

Figure 1:
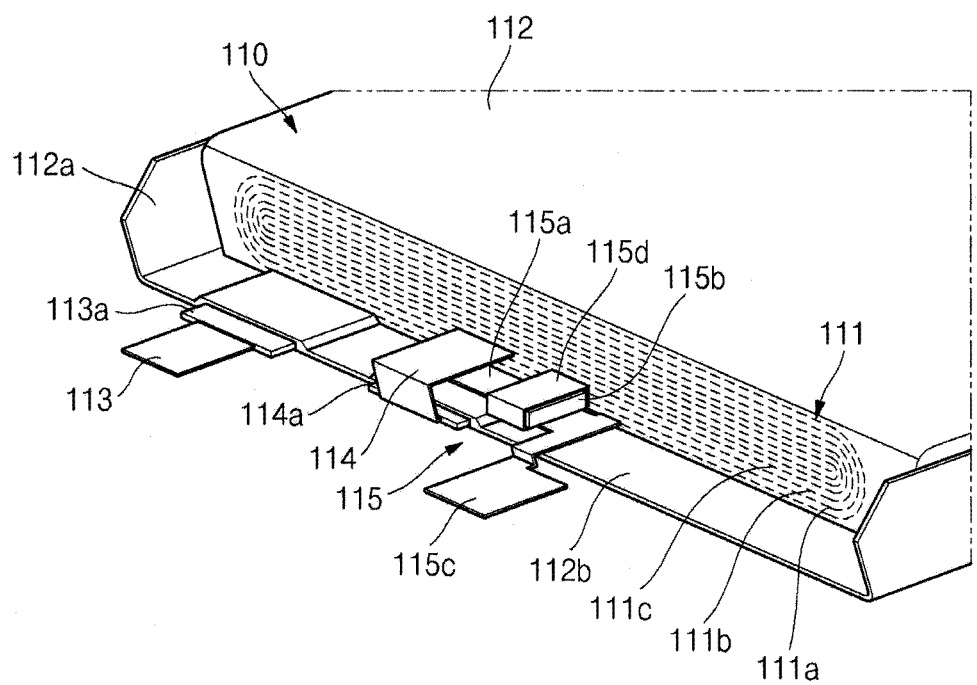
FIG. 1 is a perspective view of a battery cell of a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the disclosure to those skilled in the art. Like reference numerals refer to like elements throughout. It will be understood that when an element or layer is referred to as being "connected to" another element or layer, it can be directly connected to the other element or layer, or intervening elements or layers may be present.

Hereinafter, embodiments will be described in detail with reference to the accompanying drawings.

FIG. 1 is a perspective view of a battery cell of a secondary battery according to an embodiment.

Referring to FIG. 1, the battery cell 110 of a secondary battery according to an embodiment may include an electrode assembly 111, a pouch 112 surrounding the electrode assembly 111, and cell tabs 113 and 114.

The electrode assembly 111 includes a negative electrode plate 111a coated with a negative electrode active material, a positive electrode plate 111b coated with a positive electrode active material, and a separator 111c interposed between the negative electrode plate 111a and the positive electrode plate 111b.

In the illustrated embodiment, the electrode assembly 111 is of a winding type, but a stacking type may also be applied.

The pouch 112 is of a prismatic type and accommodates the electrode assembly 111 with an electrolyte.

The pouch 112 may include folded portions 112a formed at its opposite sides. The folded portion 112a may remain in an upwardly folded state. A terminal end of the folded portion 112a faces upward. In addition, the pouch 112 has an unfolded terminal end at its bottom surface and a planar portion 112b extending a predetermined length in a horizontal direction. The planar portion 112b exists between the opposing folded portions 112a.

The cell tabs 113 and 114 include a negative electrode tab 113 and a positive electrode tab 114 connected to the negative electrode plate 111a and the positive electrode plate 111b, respectively. Here, the negative electrode tab 113 and the positive electrode tab 114 extend and protrude to the outside through the planar portion 112b provided in the pouch 112, respectively.

The negative electrode tab 113 is electrically connected to the negative electrode plate 111a and protrudes to the outside of the pouch 112. The negative electrode tab 113 may be made of nickel (Ni), a Ni alloy, copper (Cu), or a Cu alloy.

The positive electrode tab 114 is electrically connected to the positive electrode plate 111b and protrudes to the outside of the pouch 112. The positive electrode tab 114 may be made of aluminum (Al) or an Al alloy.

Here, in order to prevent an electric short between each of the negative electrode tab 113 and the positive electrode tab 114 and the pouch 112, insulation tapes 113a and 114a are disposed between each of the negative electrode tab 113 and the positive electrode tab 114 and the planar portion 112b of the pouch 112.

The positive electrode tab 114 is electrically connected to the PTC assembly 115 such that one end of the pouch 112 exposed to the outside is bent to an upper portion of the planar portion 112b.

The PTC assembly 115 is disposed at a top end of the pouch 112 and includes a first lead plate 115a, a positive temperature coefficient (PTC) device 115b, a second lead plate 115c and a protective film 115d.

One end of the first lead plate 115a is electrically connected to the positive electrode tab 114 and the other end of the first lead plate 115a is electrically connected to a top surface of the PTC device 115b.

The PTC device 115b includes elements whose resistance increases when the temperature rises, and blocks the flow of current when the battery cell 110 is exposed to a high temperature or a high current while preventing the battery cell 110 from exploding due to an increase in the internal pressure.

The second lead plate 115c is electrically connected to a bottom surface of the PTC device 115b and the other end thereof extends in the same direction with the negative electrode tab 113 in the pouch 112. Eventually, the second lead plate 115c is disposed in substantially the same direction with the negative electrode tab 113. A width of the negative electrode tab 113 and a width of the second lead plate 115c are substantially equal to each other. Here, the second lead plate 115c comprises the same material as the positive electrode tab 114.

Here, in order to firmly fix the first lead plate 115a, the PTC device 115b and the second lead plate 115c to one another, they are wrapped by the protective film 115d.

In addition, the positive electrode tab 114 and PTC assembly 115 may be wrapped by a protective tape (not shown) to be protected from external environments. The protective tape comprises a thermally conductive acrylic foam tape including ceramic particles, a decompressive acrylic agent and a flame retardant.

Figure 2:
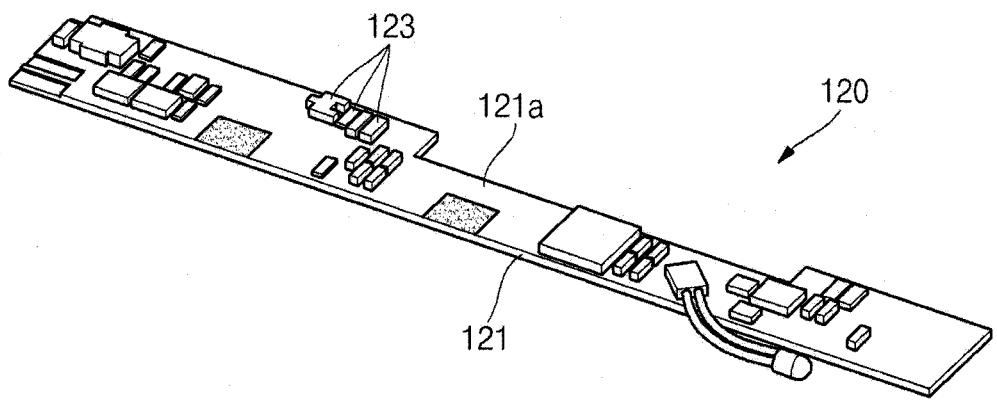
FIG. 2 is a perspective view of a protective circuit module according to an embodiment.
Figure 3:
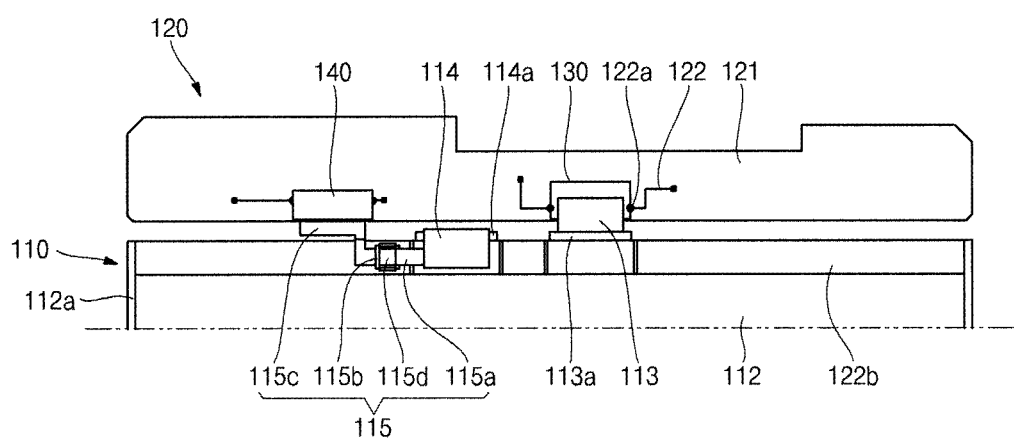
FIG. 3 is a plan view illustrating a connection relationship between a battery cell and a protective circuit module in a secondary battery according to an embodiment.
Figure 4A:
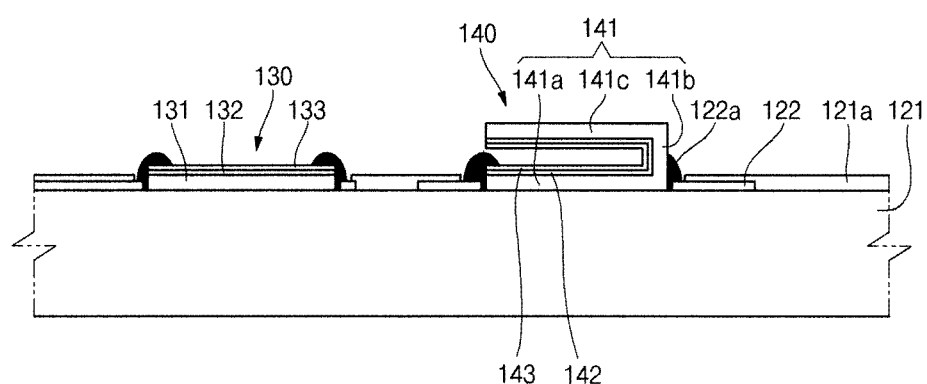
FIG. 4A is a side view of a protective circuit module of a secondary battery according to an embodiment.
Figure 4B:
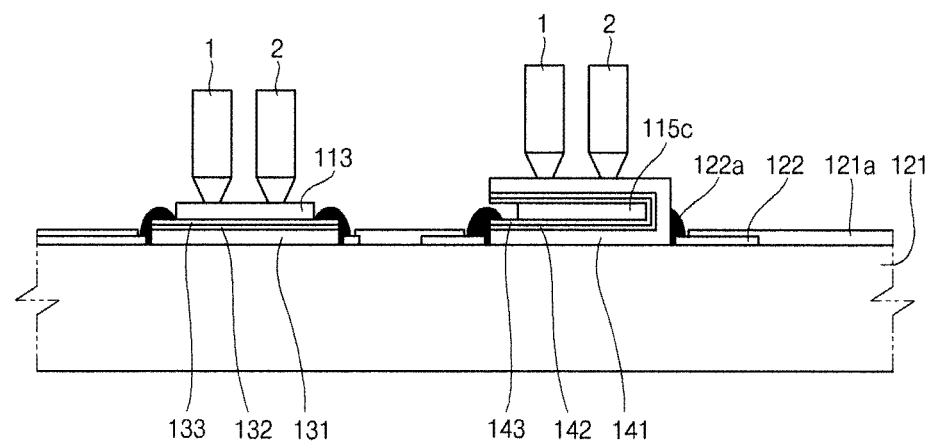
FIG. 4B is a side view illustrating a connection relationship between a cell cap of a battery cell and a protective circuit module in a secondary battery according to an embodiment.

FIG. 2 is a perspective view of a protective circuit module according to an embodiment, FIG. 3 is a plan view illustrating a connection relationship between a battery cell and a protective circuit module in a secondary battery according to an embodiment, and FIG. 4A is a side view of a protective circuit module of a secondary battery according to an embodiment, and FIG. 4B is a side view illustrating a connection relationship between a cell cap of a battery cell and a protective circuit module in a secondary battery according to an embodiment.

The protective circuit module 120 according to an embodiment will now be described with reference to FIGS. 2 to 4B.

The protective circuit module 120 includes a circuit board 121, a circuit pattern 122 and protective devices 123.

The circuit board 121 is shaped of a substantially rectangular plate and includes protective devices 123 mounted thereon. The protective device 123 for controlling an overcharge, an over-discharge, an over-current, etc. of batteries, may be electrically connected to the circuit pattern 122.

A resin layer 121a is coated on a front surface of the circuit board 121 to protect the circuit pattern 122 and the circuit board 121.

The circuit pattern 122 is coated on both surfaces of the circuit board 121.

Connection tabs 130 and 140 for electrically connecting the circuit pattern 122 to the battery cell 110 are attached to one surface of the circuit board 121.

The connection tabs 130 and 140 may be attached to the resin layer 121a formed on the circuit board 121, preferably to the circuit board 121 resulting after removing the resin layer 121a therefrom.

Here, since the connection tabs 130 and 140 are electrically connected to the circuit pattern 122, they are also electrically connected to the protective device 123.

The connection tabs 130 and 140 include a first connection tab 130 electrically connected to the negative electrode tab 113 and a second connection tab 140 electrically connected to the positive electrode tab 114.

The first connection tab 130 includes a conductive layer 131, a first plating layer 132 and a second plating layer 133, and is attached to a position of the circuit board 122 facing the negative electrode tab 113.

The conductive layer 131 is substantially planar and has a width slightly greater than that of the negative electrode tab 113, so that it can be easily welded to the negative electrode tab 113. A first plating layer 132 is formed on a top surface of the conductive layer 131 by plating, and a bottom surface of the conductive layer 131 is attached to the circuit board 121. Here, the bottom surface of the conductive layer 131 is preferably attached to the circuit board 121 using an adhesive. However, the bottom surface of the conductive layer 131 may also be mechanically coupled to the circuit board 121.

In addition, the conductive layer 131 comprises nickel Ni), a Ni alloy, copper (Cu) or a Cu alloy, which is the same as the negative electrode tab 113, and is preferably formed to a thickness of approximately 0.1 mm to approximately 0.2 mm.

If the thickness of the conductive layer 131 is smaller than about 0.1 mm, a welding rod may penetrate the conductive layer 131 during welding to apply a thermal shock to the circuit board 122. If the thickness of the conductive layer 131 is greater than about 0.2 mm, the protective circuit module 120 may become unnecessarily bulky. The conductive layer 131 preferably has a thickness of about 1.5 to about 5 times that of the circuit pattern 122.

The first plating layer 132 is formed on the top surface of the conductive layer 131 by electroless plating or electroplating. Here, the first plating layer 132 is preferably made of gold (Au), silver (Ag), copper (Cu) or alloys thereof, more preferably Cu or a Cu alloy. In order to improve weldability when welding the negative electrode tab 113 to the first connection tab 130, the first plating layer 132 is necessarily made of a material having high electrical conductivity. In addition, the first plating layer 132 is preferably formed to a thickness of approximately 0.01 mm to approximately 0.1 mm. If the thickness of the first plating layer 132 is smaller than 0.01 mm, the resulting plating may be easily peeled off. The use of electroless plating or electroplating make it difficult to form the first plating layer 132 of greater than 0.1 mm.

The second plating layer 133 is formed on a top surface of the first plating layer 132 by electroless plating or electroplating. Here, the second plating layer 133 comprises nickel (Ni), a Ni alloy, copper (Cu) or a Cu alloy, which is the same as the negative electrode tab 113, providing excellent weldability with respect to the negative electrode tab 113, and has substantially the same thickness as that of the first plating layer 132.

The circuit pattern 122 is electrically connected to substantially opposite ends of a top surface of the second plating layer 133 by a solder 122a.

The negative electrode tab 113 and the first connection tab 130 are connected in the following manner.

The negative electrode tab 113 is disposed on the top surface of the second plating layer 133 and a first welding rod 1 presses a top surface of the negative electrode tab 113. In addition, a second welding rod 2 spaced apart from the first welding rod 1 presses the negative electrode tab 113 in the same direction as the first welding rod 1. In this state, if voltages of opposite polarities are applied to the first and second welding rods 1 and 2, the negative electrode tab 113 is welded to the first connection tab 130.

The second connection tab 140 spaced apart from the first connection tab 130 is attached to a position of the circuit board 122 facing the second lead plate 115c.

The second connection tab 140 includes a conductive layer 141, a first plating layer 142 and a second plating layer 143.

The conductive layer 141 comprises nickel (Ni), a Ni alloy, copper (Cu) or a Cu alloy, which is the same as the conductive layer 131 of the first connection tab 130, and is formed to a thickness of approximately 0.1 mm to approximately 0.2 mm. If the thickness of the conductive layer 141 is smaller than 0.1 mm, a welding rod may penetrate the conductive layer 141 during welding to apply a thermal shock to the circuit board 122. If the thickness of the conductive layer 141 is greater than 0.2 mm, the protective circuit module 120 may become unnecessarily bulky.

The conductive layer 141 is substantially planar and has a first region 141a disposed on the circuit board 121, a second region 141b extending and upwardly bent from the first region 141a, and a third region 141c extending from the second region 141b and bent in substantially parallel with the first region 141a.

The first region 141a has a width slightly greater than that of the second lead plate 115c, so that it can be easily welded to the second lead plate 115c. Here, a bottom surface of the first region 141a is attached to the circuit board 121. Here, the bottom surface of the first region 141a and the circuit board 121 are preferably adhered using an adhesive. However, the bottom surface of the first region 141a may also be mechanically coupled to the circuit board 121.

The first plating layer 142 is formed on a top surface of the first region 141a, an internal surface of the second region 141b and a bottom surface of the third region 141c by electroless plating or electroplating. Here, the first plating layer 142 may be gold (Au), silver (Ag), copper (Cu) or alloys thereof, more preferably Cu or a Cu alloy. In order to improve weldability when welding the positive electrode tab 114 to the second connection tab 140, the first plating layer 142 is necessarily made of a material having high electrical conductivity. In addition, the first plating layer 142 is preferably formed to a thickness of approximately 0.01 mm to approximately 0.1 mm. If the thickness of the first plating layer 142 is smaller than 0.01 mm, the resulting plating may be easily peeled off. The use of electroless plating or electroplating make it difficult to form the first plating layer 142 of greater than 0.1 mm.

The second plating layer 143 is formed on a top surface of the first plating layer 142 by electroless plating or electroplating. Here, the second plating layer 143 comprises nickel (Ni), a Ni alloy, copper (Cu) or a Cu alloy, which is the same as the first connection tab 130, and has substantially the same thickness as that of the first plating layer 142.

The circuit pattern 122 is electrically connected to a top surface of the second plating layer 143 formed on the top surface of the first region 141a by the solder 122a. The circuit pattern 122 is also electrically connected to an external surface of the second region 141b by the solder 122a.

The second lead plate 115c and the second connection tab 140 are connected in the following manner.

The other end of the second lead plate 115c is inserted between the first region 141a and the third region 141c. The first welding rod 1 presses a top surface of the third region 141c. In addition, the second welding rod 2 spaced apart from the first welding rod 1 presses the third region 141c in the same direction as the first welding rod 1. In this state, if voltages of opposite polarities are applied to the first and second welding rods 1 and 2, the second lead plate 115c is welded to the second connection tab 140. This welding method can be used when the positive electrode tab 114 and the second lead plate 115c are made of aluminum (Al) or an Al alloy and when the second conductive layer 143 comprises nickel (Ni), a Ni alloy, copper (Cu) or a Cu alloy. In a case where the second lead plate 115c is directly welded to the second conductive layer 143, since the melting point of metallic Al, i.e., 660° C. is much smaller than the melting point of metallic Ni, i.e., 1453° C. or the melting point of metallic Cu, i.e., 1083° C., welding of the metallic Al and the metallic Ni or welding of the metallic Al and the metallic Cu is substantially difficult to achieve. However, as described above, the welding can be achieved by surrounding the metallic Al by the metallic Ni or the metallic Cu.

When the second lead plate 115c and the conductive layer 141 are made of the same material, they also have the same melting point, thereby easily achieving the welding even in a state in which the two metallic materials are brought into contact with each other in forms of planar plates.

Next, a secondary battery according to another embodiment will be described.

Figure 5A:
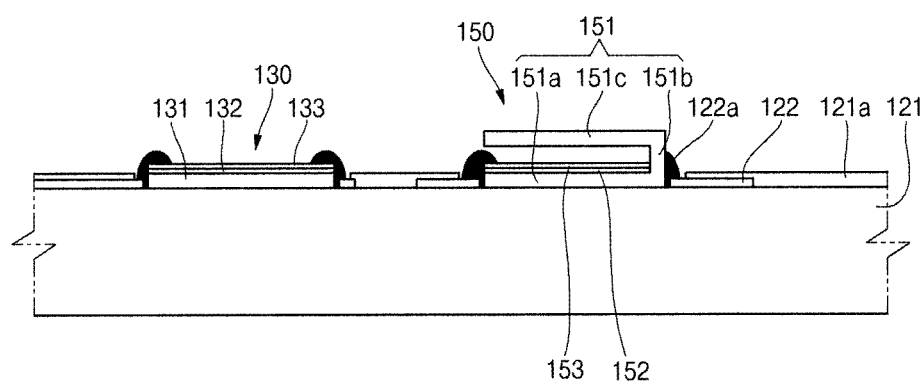
FIG. 5A is a side view of a protective circuit module according to another embodiment.
Figure 5B:
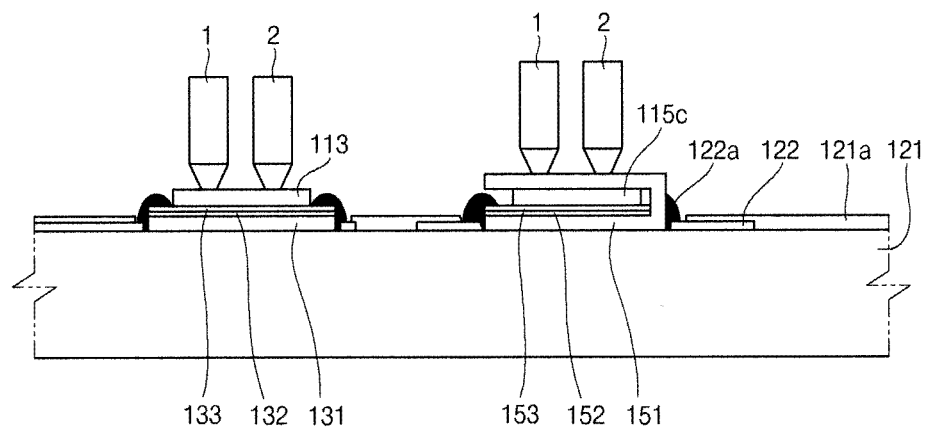
FIG. 5B is a side view illustrating a connection relationship between a cell tab of a battery cell and a protective circuit module in a secondary battery according to another embodiment.

FIG. 5A is a side view of a protective circuit module according to another embodiment, and FIG. 5B is a side view illustrating a connection relationship between a cell tab of a battery cell and a protective circuit module in a secondary battery according to another embodiment.

Referring to FIGS. 3, 5A and 5B, the secondary battery according to another embodiment includes a battery cell 110, a protective circuit module 120 and connection tabs 130 and 150.

The secondary battery according to another embodiment is different from the secondary battery shown in FIGS. 4A and 4B in view of a configuration of a second connection tab 150. Therefore, the following description of the secondary battery according to another embodiment will focus on the second connection tab 150. In addition, components of the secondary battery, which are the same as or similar to those of the secondary battery shown in FIGS. 4A and 4B, are denoted by the same reference numerals, and detailed descriptions thereof will not be given.

The second connection tab 150 includes a conductive layer 151, a first plating layer 152 and a second plating layer 153.

The conductive layer 151 comprises nickel (Ni), a Ni alloy, copper (Cu), or a Cu alloy, which is the same as the conductive layer 131 of the first connection tab 130, and is preferably formed to a thickness of approximately 0.1 mm to approximately 0.2 mm. If the thickness of the conductive layer 151 is smaller than about 0.1 mm, a welding rod may penetrate the conductive layer 151 during welding to apply a thermal shock to the circuit board 122. If the thickness of the conductive layer 151 is greater than about 0.2 mm, the protective circuit module 120 may become unnecessarily bulky.

The conductive layer 151 is substantially planar and has a first region 151a disposed on the circuit board 121, a second region 151b extending and upwardly bent from the first region 151a, and a third region 151c extending from the second region 151b and bent in substantially parallel with the first region 151a.

The first region 151a has a width slightly greater than that of the second lead plate 115c, so that it can be easily welded to the second lead plate 115c. Here, a bottom surface of the first region 151a is attached to the circuit board 121. Here, the bottom surface of the first region 151a and the circuit board 121 are preferably adhered using an adhesive. However, the bottom surface of the first region 151a may also be mechanically coupled to the circuit board 121.

The first plating layer 152 is formed on a top surface of the first region 151a, an internal surface of the second region 151b and a bottom surface of the third region 151c by electroless plating or electroplating. Here, the first plating layer 152 may be gold (Au), silver (Ag), copper (Cu) or alloys thereof, more preferably Cu or a Cu alloy. In order to improve weldability when welding the positive electrode tab 114 to the second lead plate 115c, the first plating layer 152 is necessarily made of a material having high electrical conductivity. In addition, the first plating layer 152 is preferably formed to a thickness of approximately 0.01 mm to approximately 0.1 mm. If the thickness of the first plating layer 152 is smaller than about 0.01 mm, the resulting plating may be easily peeled off. The use of electroless plating or electroplating make it difficult to form the first plating layer 152 of greater than 0.1 mm.

The second plating layer 153 is formed on a top surface of the first plating layer 152 by electroless plating or electroplating. Here, the second plating layer 153 comprises nickel (Ni), a Ni alloy, copper (Cu) or a Cu alloy, which is the same as the second plating layer 133 of the first connection tab 130, and has substantially the same thickness as that of the first plating layer 152.

The circuit pattern 122 is electrically connected to a top surface of the second plating layer 153 formed on the top surface of the first region 151a by the solder 122a. The circuit pattern 122 is also electrically connected to an external surface of the second region 151b by the solder 122a.

The second lead plate 115c and the second connection tab 150 are connected in the following manner.

The other end of the second lead plate 115c is inserted between the first region 151a and the third region 151c. The first welding rod 1 presses a top surface of the third region 151c. In addition, the second welding rod 2 spaced apart from the first welding rod 1 presses the third region 151c in the same direction as the first welding rod 1. In this state, if voltages of opposite polarities are applied to the first and second welding rods 1 and 2, the second lead plate 115c is welded to the second connection tab 150. This welding method is particularly preferred when the positive electrode tab 114 and the second lead plate 115c are made of aluminum (Al) or an Al alloy and when the second conductive layer 153 comprises nickel (Ni), a Ni alloy, copper (Cu) or a Cu alloy. In a case where the second lead plate 115c is directly welded to the second conductive layer 153, since the melting point of metallic Al, i.e., 660° C., is much smaller than the melting point of metallic Ni, i.e., 1453° C. or the melting point of metallic Cu, i.e., 1083° C., welding of the metallic Al and the metallic Ni or welding of the metallic Al and the metallic Cu is substantially difficult to achieve. However, as described above, the welding can be achieved by surrounding the metallic Al by the metallic Ni or the metallic Cu.

In a case where the second lead plate 115c and the conductive layer 151 are made of the same material, they also have the same melting point, thereby easily achieving the welding even in a state in which the two metallic materials are brought into contact with each other in forms of planar plates.

The second connection tab 140 according to an embodiment is formed to have a 'U' shaped configuration so as to facilitate welding of the second lead plate 115c by the same functional effect as the second connection tab 150 according to another embodiment.

However, first and second plating layers 142 and 143 are more easily formed on the conductive layer 141 in the second connection tab 140 than in the second connection tab 150 according to another embodiment, and the second connection tab 150 has a smaller thickness than the second connection tab 140 according to an embodiment.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present disclosure as set forth in the following claims.

What is claimed is:

1. A secondary battery comprising:
   a battery cell having a cell tab;
   a protective circuit module electrically connected to the cell tab and having a circuit pattern formed thereon; and
   a connection tab attached to the protective circuit module and electrically connected to the circuit pattern;
   wherein the connection tab includes a first connection tab connected to the negative electrode tab and a second connection tab connected to the positive electrode tab,
   wherein the connection tab includes a conductive layer adhered to the protective circuit module and includes a first plating layer formed on the conductive layer and a second plating layer formed on the first plating layer, and the cell tab is welded to the connection tab, wherein the conductive layer of the second connection tab includes a first region disposed in the protective circuit module, a second region upwardly bent from the first region, and a third region bent from the second region to be parallel with the first region, and wherein the first and second plating layers of the second connection tab are formed on the first region, the second region and the third region.

2. The secondary battery of claim 1, wherein the conductive layer comprises nickel (Ni).

3. The secondary battery of claim 2, wherein the conductive layer is adhered to the protective circuit module using an adhesive.

4. The secondary battery of claim 1, wherein the circuit pattern is soldered to the connection tab.

5. The secondary battery of claim 1, wherein the first plating layer comprises at least one metal selected from the group consisting of gold (Au), silver (Ag) and copper (Cu).

6. The secondary battery of claim 1, wherein the second plating layer comprises nickel (Ni).

7. The secondary battery of claim 1, wherein the conductive layer has a thickness in a range of 0.1 to 0.2 mm, and the first plating layer and the second plating layer have a thickness in a range of 0.01 to 0.1 mm.

8. The secondary battery of claim 1, wherein the thickness of the conductive layer is 1.5 to 5 times that of the circuit pattern.

9. The secondary battery of claim 1, wherein the conductive layer comprises nickel (Ni).

10. The secondary battery of claim 1, wherein the conductive layer is adhered to the protective circuit module using an adhesive.

11. The secondary battery of claim 1, wherein the circuit pattern is soldered to the connection tab.

12. The secondary battery of claim 1, wherein the first plating layer comprises at least one metal selected from the group consisting of gold (Au), silver (Ag) and copper (Cu).

13. The secondary battery of claim 1, wherein the second plating layer comprises nickel (Ni).

* * * * *